United States Patent
Ravi et al.

(10) Patent No.: US 12,151,373 B2
(45) Date of Patent: *Nov. 26, 2024

(54) RECONFIGURABLE ROBOTIC MANUFACTURING CELLS

(71) Applicant: Google LLC, Mountain View, CA (US)

(72) Inventors: Nivedita Ravi, Redmond, WA (US); John William Zevenbergen, IV, Woodway, WA (US); Joseph Neil Reichenbach, Snoqualmie, WA (US); Toby Ge Xu, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,489

(22) Filed: Sep. 14, 2023

(65) Prior Publication Data

US 2024/0031364 A1     Jan. 25, 2024

Related U.S. Application Data

(63) Continuation of application No. 17/974,848, filed on Oct. 27, 2022, now Pat. No. 11,858,134, which is a
(Continued)

(51) Int. Cl.
*G06F 17/00* (2019.01)
*B25J 9/00* (2006.01)
(Continued)

(52) U.S. Cl.
CPC .............. *B25J 9/08* (2013.01); *B25J 9/0093* (2013.01); *B25J 11/005* (2013.01); *B25J 15/04* (2013.01);
(Continued)

(58) Field of Classification Search
CPC . B25J 9/08; B25J 9/0093; B25J 11/005; B25J 15/04; B25J 9/1617; B25J 21/00;
(Continued)

(56) References Cited

U.S. PATENT DOCUMENTS 5,353,490 A    10/1994 Kukuljan
6,591,488 B1    7/2003 Tachibana
(Continued)

FOREIGN PATENT DOCUMENTS

CN    103003032    3/2013
CN    107234634    10/2017
(Continued)

OTHER PUBLICATIONS

An Overview of Industrial Robots Control and Programming Approaches (Year: 2023).*
(Continued)

*Primary Examiner* — Ronnie M Mancho
(74) *Attorney, Agent, or Firm* — Fish & Richardson P.C.

(57) ABSTRACT

A manufacturing process adopting the reconfigurable robotic manufacturing cells that can work conjointly and yet have the capabilities to be reconfigured to disconnect from other cells and handle multiple tasks. The reconfigurable robotic cell is not dependent on any other robotic cells to complete work in progress.

14 Claims, 3 Drawing Sheets

Related U.S. Application Data continuation of application No. 16/540,502, filed on Aug. 14, 2019, now Pat. No. 11,504,845.

(51) Int. Cl.
| | |
|---|---|
| *B25J 9/08* | (2006.01) |
| *B25J 11/00* | (2006.01) |
| *B25J 15/04* | (2006.01) |
| *G05B 19/418* | (2006.01) |
| *H04L 9/40* | (2022.01) |

(52) U.S. Cl.
CPC ..... *G05B 19/4182* (2013.01); *G05B 19/41845* (2013.01); *H04L 63/0236* (2013.01); *H04L 63/0876* (2013.01); *H04L 63/20* (2013.01)

(58) Field of Classification Search
CPC .......... B25J 9/1682; B25J 13/00; B25J 11/00; G05B 19/4182; G05B 19/41845; G05B 2219/40302; G05B 2219/40304; H04L 63/0236; H04L 63/0876; H04L 63/20; Y02P 90/02
USPC .......................................................... 726/4
See application file for complete search history.

(56) References Cited

U.S. PATENT DOCUMENTS

| | | | |
|---|---|---|---|
| 8,584,349 B2 | 11/2013 | Scannon et al. | |
| 9,026,248 B1 | 5/2015 | Hickman et al. | |
| 9,472,011 B2 | 10/2016 | Linnell | |
| 9,718,188 B2 * | 8/2017 | Stubbs .................. | B25J 9/1679 |
| 9,815,155 B2 | 11/2017 | Lin et al. | |
| 10,678,216 B2 | 6/2020 | Wolf et al. | |
| 10,965,083 B2 | 3/2021 | Pechter et al. | |
| 11,097,418 B2 | 8/2021 | Nagarajan et al. | |
| 11,345,040 B2 | 5/2022 | Oleynik | |
| 11,504,845 B2 * | 11/2022 | Ravi ........................ | B25J 15/04 |
| 11,520,322 B2 | 12/2022 | Mark et al. | |
| 11,858,134 B2 * | 1/2024 | Ravi .................. | G05B 19/4182 |
| 2002/0193909 A1 | 12/2002 | Parker et al. | |
| 2004/0133310 A1 * | 7/2004 | Watanabe .............. | B25J 9/1682 |
| | | | 700/245 |
| 2009/0118858 A1 | 5/2009 | Wallace et al. | |
| 2014/0277713 A1 | 9/2014 | Kouno et al. | |
| 2014/0342834 A1 | 11/2014 | Tappeiner et al. | |
| 2014/0350722 A1 | 11/2014 | Skrinde | |
| 2015/0057875 A1 | 2/2015 | McGinnis et al. | |
| 2016/0132059 A1 | 5/2016 | Mason et al. | |
| 2016/0171798 A1 | 6/2016 | McGinnis et al. | |
| 2016/0288280 A1 | 10/2016 | Lin et al. | |
| 2017/0277173 A1 * | 9/2017 | Bonomi ................. | G06Q 50/04 |
| 2018/0339456 A1 * | 11/2018 | Czinger ................ | B33Y 30/00 |
| 2019/0091535 A1 | 3/2019 | DeCarlo | |
| 2022/0089237 A1 | 3/2022 | Sverdlov et al. | |
| 2023/0123504 A1 | 4/2023 | Paolozzi et al. | |

FOREIGN PATENT DOCUMENTS

| | | | |
|---|---|---|---|
| CN | 108025438 | 5/2018 | |
| DE | 4212178 | 10/1993 | |
| EP | 1426842 A2 * | 6/2004 | ............ B25J 9/1682 |
| WO | WO 2018174940 | 9/2018 | |
| WO | WO 2018217890 | 11/2018 | |

OTHER PUBLICATIONS

Atsautomation.com [online], "Robotic Cells," 2019, retrieved on Aug. 19, 2019, retrieved from URL<https://www.atsautomation.com/en/Technology/Platforms/Robotic%20Cells.aspx>, 2 pages.

Bruccoleri, "Reconfigurable control of robotized manufacturing cells." Robotics and Computer-Integrated Manufacturing 23.1, Feb. 2007, 94-106.

Extended European Search Report in European Appln. No. 20191144.3, mailed on Dec. 14, 2020, 9 pages.

Office Action in Chinese Appln. No. 202010820998.5, mailed on Dec. 30, 2022, 24 pages (with English Translation).

Office Action in European Appln. No. 20191144.3, mailed on Feb. 22, 2023, 8 pages.

Setchi et al., "Reconfigurability and reconfigurable manufacturing systems: state-of-the-art review." 2nd IEEE International Conference on Industrial Informatics, 2004. INDIN'04, Jun. 2004, 529-535.

Extended European Search Report in European Appln. No. 23212285.3, mailed on Mar. 19, 2024, 10 pages.

* cited by examiner

RECONFIGURABLE ROBOTIC MANUFACTURING CELLS

CROSS-REFERENCE TO RELATED APPLICATION

This application is a continuation of U.S. application Ser. No. 17/974,848, filed on Oct. 27, 2022, which is a continuation of U.S. application Ser. No. 16/540,502, filed on Aug. 14, 2019, now U.S. Pat. No. 11,504,845. The disclosures of the prior applications are considered part of and are incorporated by reference in the disclosure of this application.

BACKGROUND

This specification relates to configuring robotic cells to improve overall efficiency of a robotic manufacturing process.

A robotic manufacturing process is a manufacturing process that deploys one or more robotic cells for performing certain tasks during the process. Each robotic cell in turn includes at least one robot with at least one corresponding end effector. Optionally, a robotic cell further includes controller, sensors, conveyance systems, and so on. A robotic manufacturing process typically has greater throughput and safety than a manufacturing process for a same product that relies solely on human labor.

SUMMARY

This specification describes technologies relating to robotic manufacturing cells that can work conjointly and yet have the capabilities to be reconfigured to disconnect from other cells and handle multiple tasks.

In general, one innovative aspect of the subject matter described in this specification can be embodied in methods that include the actions of selecting, by each of a plurality of robotic cells that each includes a set of end effectors, a selected set of end effectors from the set of end effectors to perform an assigned manufacturing process step, wherein: the assigned manufacturing processing step is one of the manufacturing processing steps in the manufacturing process; and the set of end effectors for each robotic cell includes end effectors to form a selected set for at least one of the manufacturing processing steps; receiving, by a manufacturing execution system in data communication with each of the robotic cells, data describing progress of the manufacturing process; based on the received data, determining that a first robotic cell performing a first manufacturing processing step is to be reconfigured to perform a second manufacturing processing step that is different from the first manufacturing processing step; and in response to the determining, instructing the first robotic cell to reconfigure from a selected first set of end effectors for performing the first manufacturing processing step to a selected second set of end effectors for performing the second manufacturing processing step.

The methods may further comprise determining that a third robotic cell performing a third manufacturing processing step is to be reconfigured to perform the second manufacturing processing step that is different from the third manufacturing processing step; and in response to the determining, instructing the third robotic cell to reconfigure from a selected third set of end effectors for performing the third manufacturing processing step to a selected second set of end effectors for performing the second manufacturing processing step. The methods may further comprise determining that the set of end effectors for the first robotic cell includes end effectors to form a selected set for the second manufacturing processing step. The methods may further comprise determining that the second manufacturing processing step is within a work envelope of the first robotic cell. The method may further comprise determining that instructing the first robotic cell to perform the second manufacturing processing step does not interfere with other robotic cells in the plurality of robotics cells. The methods may further comprise a sequence of manufacturing processing steps, and the first manufacturing processing step precedes the second manufacturing processing step, and the second manufacturing processing step further precedes the third manufacturing processing step in the sequence. The methods may further comprise providing, by one or more sensors, sensor data to the manufacturing execution system, wherein the manufacturing execution system determines progress of the manufacturing process from the sensor data. The methods may further comprise in response to instructing the first robotic cell to reconfigure from a selected first set of end effectors for performing the first manufacturing processing step to a selected second set of end effectors for performing the second manufacturing processing step, instructing a conveyance system to reconfigure from delivering materials to be processed by the first manufacturing processing step to the first robotic cell to delivering materials to be processed by the second manufacturing processing step to the first robotic cell.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The reconfigurable robotic manufacturing cells can work conjointly and yet have the capabilities to be reconfigured to disconnect from other cells and handle multiple tasks. Compared to conventional, linear manufacturing processes, a manufacturing process adopting the reconfigurable robotic manufacturing cells generally achieves higher flexibility, lesser footprint usage, reduced buffering requirements, and lowered number of failure occurrences. The reconfigurable manufacturing process also requires less robotic manufacturing cells, which is better suited for low-medium volume production with higher variability in configuration numbers. In some cases, one reconfigurable robotic cell is not dependent on any other robotic cells to complete work in progress. The reconfigurable robotic cell picks the next work available (in any step that might be available at) and performs the necessary task.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
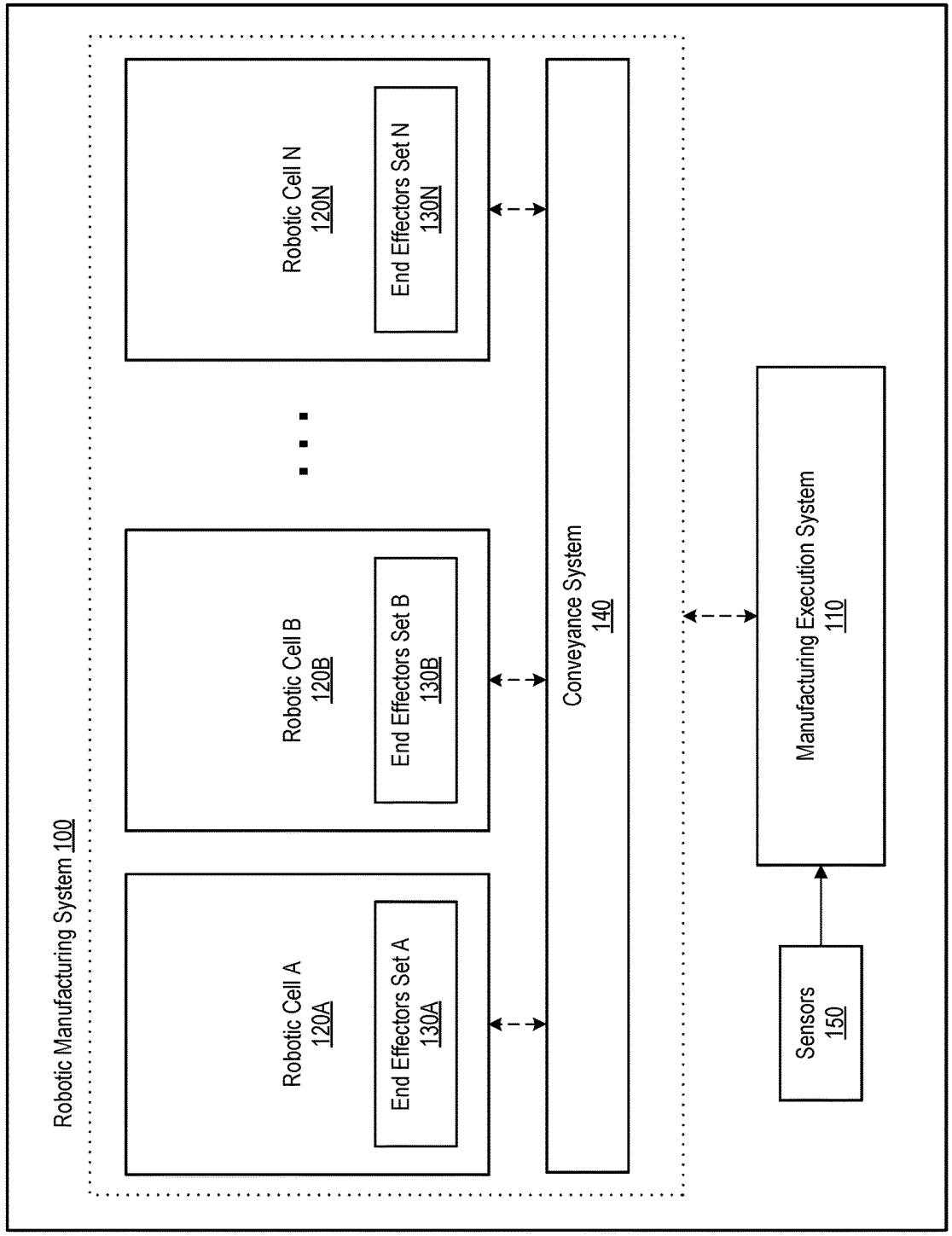
FIG. 1 shows an example robotic manufacturing system.

Like reference numbers and designations in the various drawings indicate like elements.

The specification describes a modular automated robotic manufacturing unit with individual robotic cells working conjointly and yet have the capacity to disconnect in the event of failure or bottlenecks. The modular automated robotic manufacturing unit is designed to have flexibility and multi-part handling capability in every cell.

In operation, a system includes a plurality of robotic cells that are each configurable to perform a plurality of manufacturing processing steps in a manufacturing process. Each robotic cell includes a set of end effectors and is operable to select from the set of end effectors a selected set of end effectors to perform an assigned manufacturing process step. The assigned manufacturing processing step is one of the manufacturing processing steps in the manufacturing process.

In some implementations, the manufacturing process includes a sequence of manufacturing processing steps, i.e., a first manufacturing processing step precedes a second manufacturing processing step in the sequence, and the second manufacturing processing step further precedes a third manufacturing processing step in the sequence, and so on.

The set of end effectors for each robotic cell includes end effectors to form a selected set for at least one of the manufacturing processing steps. In some implementations, a robotic cell includes end effectors for all manufacturing processing steps. Alternatively, a robotic cell only includes end effectors for one or some of the manufacturing processing steps.

The system also includes a manufacturing execution system that is in data communication with each of the robotic cells. The system is configured to receive data from one or more sensors. The system determines progress of the manufacturing process from the sensor data.

Based on the received data, the system determines that a first robotic cell performing a first manufacturing processing step is to be reconfigured to perform a second manufacturing processing step that is different from the first manufacturing processing step. The system can make this determination in any of a variety of ways. For example, the system can determine, from the sensor data that the first robotic cell is in idle condition. As another example, the system can determine, from the sensor data, that there exists a shortage in delivery of materials by a conveyance system to be processed by the first robotic cell in the first manufacturing processing step.

In response to a positive determination, the system instructs the first robotic cell to reconfigure from a selected first set of end effectors for performing the first manufacturing processing step to a selected second set of end effectors for performing the second manufacturing processing step. The first robotic cell then performs the reconfiguration in association with an end effector changing system.

In addition, the system instructs the conveyance system to reconfigure from delivering materials to be processed by the first manufacturing processing step to the first robotic cell to delivering materials to be processed by the second manufacturing processing step to the first robotic cell.

These features and additional features will be described in more detail below.

FIG. 1 shows an example robotic manufacturing system 100. The robotic manufacturing system 100 is an example of a system in which the systems, components, and techniques described below can be implemented.

In general, a robotic manufacturing system is a manufacturing system that adopts one or more robotic cells to perform respective manufacturing processes of certain products. Each robotic cell in turn includes one robot. The robot can be any of a variety of robots that are appropriate for the manufacturing processes. An industrial robot with three or more axes, for instance, is a common example of robots that are deployed in many manufacturing environments.

Typically, a manufacturing process includes a sequence of manufacturing processing steps. That is, a first manufacturing processing step precedes a second manufacturing processing step in the sequence, and the second manufacturing processing step further precedes a third manufacturing processing step in the sequence, and so on. In some implementations, while being executed in a predetermined sequence, certain manufacturing processing steps are practically independent from others. The respective positions of these steps in the predetermined sequence may only be results of economic or efficiency concerns. In these implementations, without risks of halting the overall manufacturing process, the certain manufacturing processing steps can be executed before the completion of some or all of their preceding steps in the sequence.

In particular, in the example depicted in FIG. 1, the robotic manufacturing system 100 includes a plurality of robotic cells, e.g., robotic cells A-N and a plurality of corresponding end effector sets, e.g., end effector sets A-N. Although three robotic cells are depicted in FIG. 1, the robotic manufacturing system 100 may include more or less robotic cells.

Each robotic cell in turn includes a robot (not shown in the figure), and optionally, other peripherals such as power source and safety equipment. Each robot and the corresponding peripherals are operable to jointly perform certain manufacturing processing steps. It should be noted that, for convenience, the manufacturing processing steps described in this document are largely described to be performed by a robotic cell, instead of a robot.

A robotic cell (e.g., robotic cell A) is operable to select from the respective set of end effectors (e.g., end effectors set A) a selected set of end effectors to perform an assigned manufacturing process step. The assigned manufacturing processing step is one of the manufacturing processing steps in the manufacturing process.

In some implementations, a robotic cell selects a selected set of end effectors from a set of end effectors using an end effector changing system. The end effector changing system allows an end effector to automatically couple to or decouple from a robot within the robotic cell. In these implementations, some or all of the robotic cells may further include a respective end effector changing system (not shown in the figure).

The robotic manufacturing system 100 includes a conveyance system 140. The conveyance system 140 handles the flow of products, components, and materials between different robotic cells during the manufacturing process. For example, the conveyance system 140 can deliver materials required by a manufacturing processing step to a corresponding robotic cell that is configured to perform the particular manufacturing processing step. As another example, the conveyance system 140 can transport products that have finished being processed by a manufacturing processing step to another robotic cell that is configured to perform a subsequent manufacturing processing step in the sequence.

The system 100 includes a manufacturing execution system 110 that is in data communication with each of the plurality of robotics cells 120A-N and the conveyance system 140. The manufacturing execution system 110 is configured to monitor and control the overall manufacturing process. In some implementations, monitoring and controlling are optionally performed in conjunction with other resource planning and process control systems (not shown in the figure).

The system 100 further includes one or more sensors 150 that are communicatively coupled to the manufacturing execution system 110. Example sensors may include laser distance sensors, photo-eyes, vision cameras, lighting, pneumatic and electrical actuators, and so on. The sensors can provide data describing a latest status of the manufacturing process. The system then determines progress of the manufacturing process from the received sensor data. Although illustrated as being logically associated with the manufacturing execution system 110, some or all of the sensors 150 can be installed anywhere within the robotic manufacturing system 100, including inside the robotic cells 120A-120N and the conveyance system 140.

During the manufacturing process, under certain circumstances, the manufacturing execution system 110 can determine, based on received sensor data, whether to instruct a robotic cell to reconfigure from performing a first manufacturing step to performing a second manufacturing step. Example circumstances may include events of equipment failure, production bottlenecks, and so on. Determining whether to instruct a robotic cell performing a first manufacturing step to reconfigure to perform a second manufacturing processing step that is different from the first manufacturing step will be described in more detail below with respect to FIGS. 3 and 4.

Figure 2:
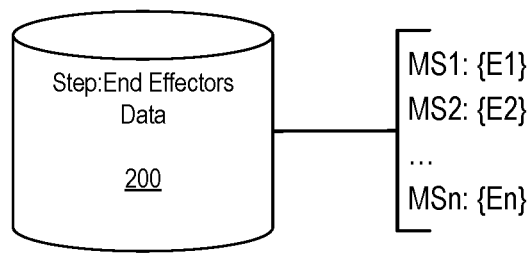
FIG. 2 shows an example format of end effectors data stored in a data store.

FIG. 2 shows an example format of end effectors data stored in a data store 200. The data store 200 may be physically located in the manufacturing execution system 110 of FIG. 1. Alternatively, the data store 200 may be a cloud data store that provides end effectors data to the conveyance system 140 over a data communication network.

The data store 200 stores and manages data defining the one or more types of end effectors that are required for performing each of the manufacturing processing steps in a particular manufacturing process. For instance, as shown in FIG. 2, each piece of data may specify that for a particular manufacturing processing step (e.g., "MS1") in a particular manufacturing process, a list of one or more types of end effectors (e.g., "{E1}") are required. Example end effectors in the list may include grippers, fastening tools, material removal tools, welding torches, and so on.

Figure 3:
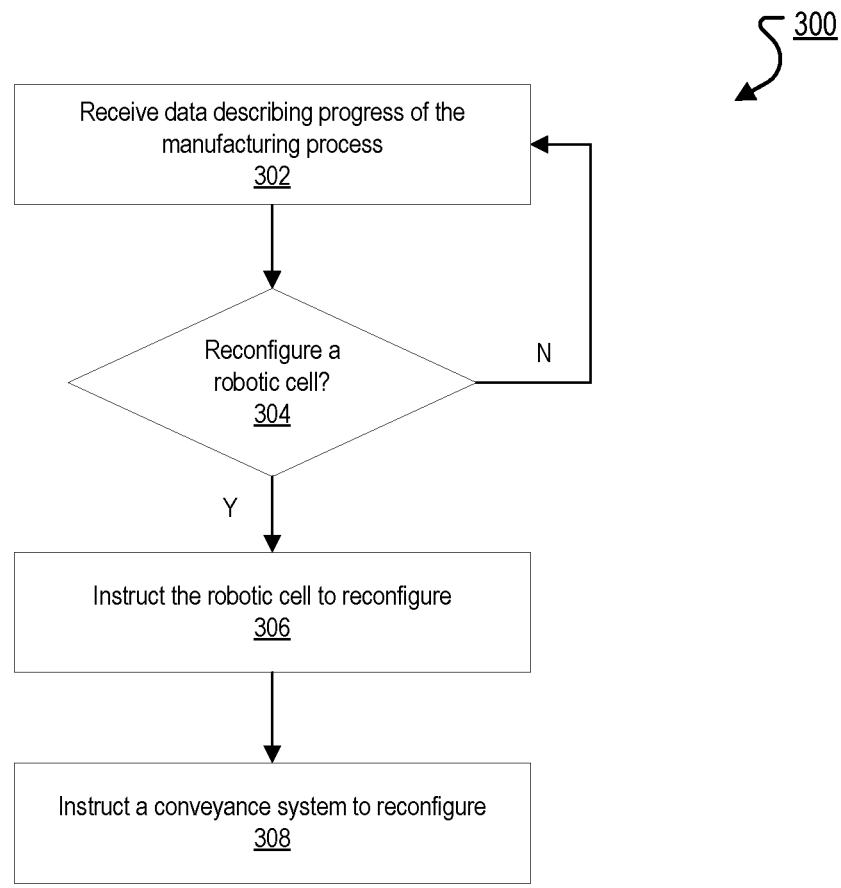
FIG. 3 shows a flow diagram of an example process for reconfiguring a robotic manufacturing system.

FIG. 3 shows a flow diagram of an example process 300 for reconfiguring a robotic manufacturing system. For convenience, the process 300 will be described as being performed by a robotic manufacturing system. For example, the robotic manufacturing system 100 of FIG. 1, appropriately programmed in accordance with this specification, can perform the process 300.

The system receives sensor data describing a latest status of the manufacturing process (302). Example sensor data may include robotic cells operation status, end effectors information, raw materials stock level, conveyance system tracking status, and so on.

Based on received sensor data, and as will be described in more detail below with respect to FIG. 4, the system determines whether to reconfigure a robotic cell (304).

If the system determines not to reconfigure any robotic cells, the process 300 returns to step 302. That is, the system maintains current robotic cell configurations for performing the manufacturing process. And the system continues to receive sensor data describing a latest status of the manufacturing process.

Alternatively, if the system determines to reconfigure at least one robotic cell, the system proceeds to instruct the robotic cell to reconfigure (306). As one particular example, upon receiving sensor data indicating that a second robotic cell performing a second manufacturing process step, e.g., MS2, is lagging in progress relative to other cells, the system determines that a first robotic cell performing a first manufacturing processing step, e.g., MS1, is to be reconfigured to perform the second manufacturing processing step. In particular, the second manufacturing step is different from the first manufacturing processing step and thus requires at least one new end effector. In response to the determining, the system instructs the first robotic cell to reconfigure from a selected first set of end effectors, e.g., {E1} for performing the first manufacturing processing step to a selected second set of end effectors, e.g., {E2} for performing the second manufacturing processing step.

In this particular example, in addition to reconfiguring the first robotic cell, the system further determines that a third robotic cell performing a third manufacturing processing step, MS3, is to be reconfigured to perform the second manufacturing processing step, MS2. The third manufacturing processing step is different from both the first and the second manufacturing processing steps. In response to the determining, the system instructs the third robotic cell to reconfigure from a selected third set of end effectors {E3} for performing the third manufacturing processing step to a selected second set of end effectors {E2} for performing the second manufacturing processing step.

In some implementations, following a positive determination and prior to sending instructions, the system further determines the feasibility of reconfiguring the robotic cell. For example, the system determines whether the set of end effectors for the first robotic cell includes end effectors to form a selected set for the second manufacturing processing step. The system can make this determination by comparing sensor data describing the end effectors sets in each of the robotic cells with the end effectors data stored in the data store of FIG. 2.

As another example, the system determines whether the second manufacturing processing step is within a work envelope (i.e., a range of movement) of the first robotic cell. A particular manufacturing processing step may be restricted to certain space within the system, i.e., a certain area on the conveyance system. And the work envelope confines the space in which a robotic cell can operate. In other words, a robotic cell can only perform certain manufacturing processing steps that are located within an operable space of the robotic cell.

As another example, the system determines whether instructing the first robotic cell to perform the second manufacturing processing step will interfere with other robotic cells in the plurality of robotics cells. That is, the system determines whether reconfiguring the first robotic cell will risk interrupting the operations of other robotic cells. Example interruptions may include collisions between robots from different robotic cells, depletion of raw material supplies to multiple robotic cells by one single cell, and so on.

Upon determining a confirmed feasibility of reconfiguring the robotic cell performing a first manufacturing processing step to perform a second manufacturing processing step, the system proceeds to sending the corresponding instructions.

After instructing the robotic cell to reconfigure, the system further proceeds to instruct a conveyance system to reconfigure accordingly (308). Referring back to the particular example as described above, after instructing the first robotic cell to reconfigure from performing the first manufacturing processing step to performing the second manufacturing processing step, the system further instructs a conveyance system to reconfigure from delivering materials (e.g., products, components, raw materials, etc.) to be processed by the first manufacturing processing step to the first robotic cell to delivering materials to be processed by the second manufacturing processing step to the first robotic cell.

The process 300 then returns to step 302, i.e., the system continues to receive sensor data describing a latest status of the manufacturing process using the one or more reconfigured robotic cells and conveyance systems.

Figure 4:
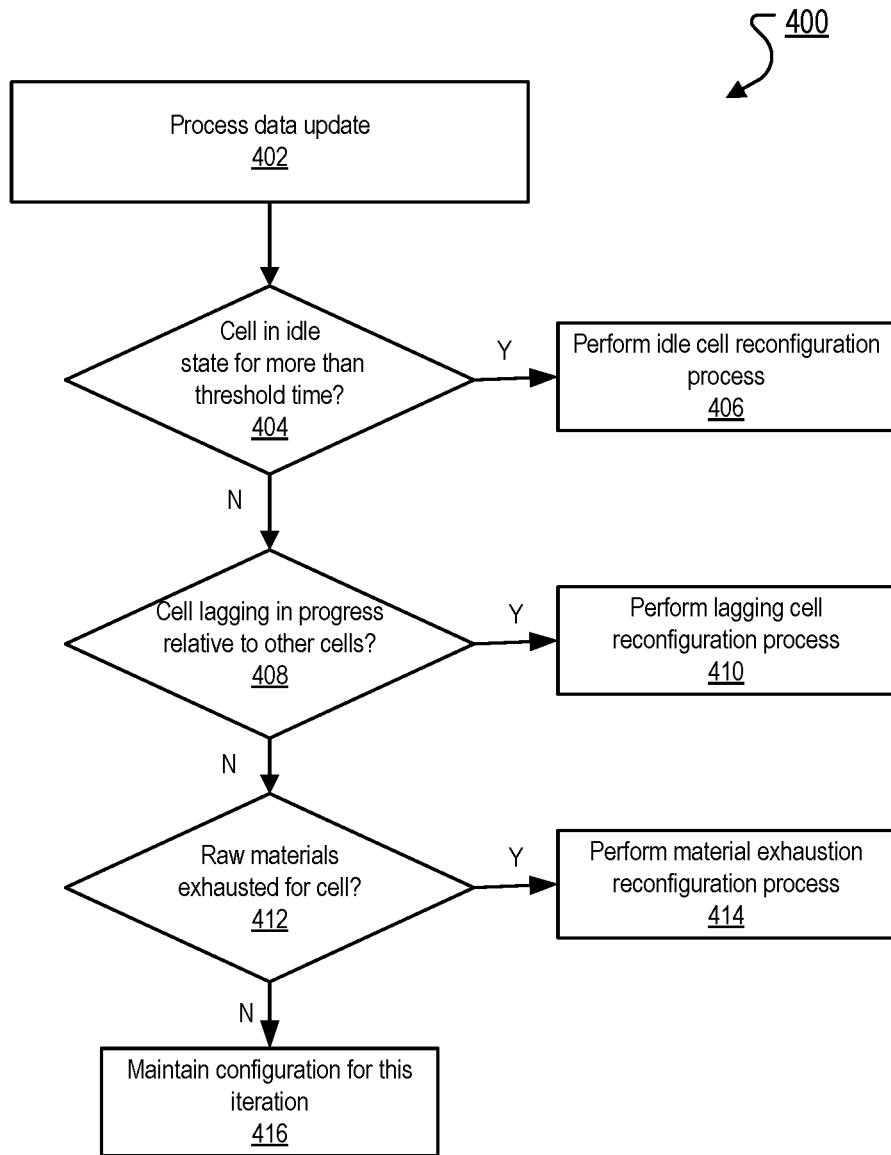
FIG. 4 shows a flow diagram of an example process for determining whether to reconfigure a robotic manufacturing system.

FIG. 4 shows a flow diagram of an example process 400 for determining whether to reconfigure a robotic manufacturing system. For convenience, the process 400 will be described as being performed by a robotic manufacturing system. For example, the robotic manufacturing system 100 of FIG. 1, appropriately programmed in accordance with this specification, can perform the process 400.

Upon receiving sensor data describing a latest status of the manufacturing process, the system updates the data used for determining whether to perform reconfiguration processes (402). Overall, reconfiguring a robotic cell aims at increasing utilization of manufacturing equipment, which potentially leads to improved overall manufacturing throughputs.

The system determines whether a robotic cell is in idle state for more than a threshold time (404). Specifically, the system determines, based on sensor data describing operation status of each robotic cells, if any one of the cells have not been in operation for a predetermined period of time.

If the system makes a positive determining, the system then performs idle cell reconfiguration process (406). That is, the system determines to instruct the robotic cell in idle state to reconfigure from performing the currently assigned manufacturing processing step to performing a different manufacturing processing step. The different manufacturing processing step is one of the manufacturing processing steps in the manufacturing process that may or may not be being performed by other robotic cells. In some implementations, the system further determines to instruct the conveyance system to reconfigure from delivering materials to be processed by the currently assigned manufacturing processing step to the robotic cell to delivering materials to be processed by the different manufacturing processing step to the robotic cell.

The system determines whether a robotic cell is lagging in progress relative to other cells (408). In particular, the system can make this determination in any of a variety of ways. For example, during a fixed period of time, the system can compare the amount of work completed by a robotic cell with an average amount of work completed by all robotic cells and determine that the robotic cell is lagging in process if the amount of work completed by the robotic cell is below the average.

As another example, for a fixed amount of completed work, the system can compare the length of time taken by a robotic cell with an average length of time taken by all robotic cells and determine that the robotic cell is lagging in progress if the length of time is above the average. Specifically, in these two examples, an amount of work completed by a robotic cell can be defined using any appropriate metrics, including a percentage of completed overall manufacturing process, an amount of used raw materials, and the like.

As another example, the system can maintain data defining respective desired progresses for each of the robotic cells and determine that a robotic cell is lagging in progress if the actual progress of the robotic cell fails to meet the desired progress.

If the system makes a positive determining, the system performs lagging cell reconfiguration process (410). That is, the system determines to instruct one or more other robotics cells to reconfigure from performing one or more other manufacturing processing steps to performing the step that is currently being performed by the lagging cell. In some implementations, the system further determines to instruct the conveyance system to make corresponding reconfigurations.

The system determines whether raw materials are exhausted for a particular robotic cell (412). For example, the system can make this determination based on sensor data describing raw materials stock level for each of the manufacturing processing steps that are being performed by respective robotic cells.

If the system makes a positive determining, i.e., the raw materials stock for a robotic cell is below a predetermined level, the system performs material exhaustion reconfiguration process (414). That is, the system determines to instruct the robotic cell to reconfigure from performing the currently assigned manufacturing processing step to performing a different manufacturing processing step that does not use the exhausted materials. In some implementations, the system further determines to instruct the conveyance system to make corresponding reconfigurations.

While three determining steps (404, 408, and 412) are depicted in the flow chart, in actual manufacturing processes, there may be more or less factors that may affect the reconfiguration decision. Accordingly, there may be more or less steps in the iteration for determining whether to reconfigure a robotic manufacturing system.

At the end of the current iteration, if the determining results in previous steps are all negative, the system maintains current configuration (416), i.e., the system determines not to reconfigure any robotic cells for this iteration.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
  a plurality of robotic cells that are each configurable to perform a plurality of manufacturing processing steps in a manufacturing process, wherein:
    each robotic cell includes a set of end effectors and is operable to select from the set of end effectors a selected set of end effectors to perform an assigned manufacturing process step, wherein the assigned manufacturing processing step is one of the manufacturing processing steps in the manufacturing process; and
    the set of end effectors for each robotic cell includes end effectors to form a selected set for at least one of the manufacturing processing steps; and
  a conveyance system that delivers materials to the robotic cells for processing according to the respective assigned manufacturing processing steps; and
  a manufacturing execution system in data communication with each of the robotic cells that is configured to:
    receive data describing a status of the manufacturing process, the data describing, for each robotic cell configured to perform a manufacturing processing step, a status of the robotic cell;

based on the status of each of the robotic cells described by received data, determine to reconfiguring a first robotic cell performing a first manufacturing processing step to perform a second manufacturing processing step, wherein the second manufacturing processing step is different from the first manufacturing processing step and instruct the first robotic cell to reconfigure from a selected first set of end effectors for performing the first manufacturing processing step to a selected second set of end effectors for performing the second manufacturing processing step; and in response to instructing the first robotic cell to reconfigure from the selected first set of end effectors for performing the first manufacturing processing step to the selected second set of end effectors for performing the second manufacturing processing step, instruct the conveyance system to reconfigure from delivering materials to be processed by the first manufacturing processing step to the first robotic cell to delivering materials to be processed by the second manufacturing processing step to the first robotic cell.

2. The system of claim 1, wherein determining to reconfiguring a first robotic cell performing a first manufacturing processing step to perform a second manufacturing processing step further comprises:

determining that the set of end effectors for the first robotic cell includes end effectors to form a selected set for the second manufacturing processing step.

3. The system of claim 1, wherein determining to reconfiguring a first robotic cell performing a first manufacturing processing step to perform a second manufacturing processing step further comprises determining that the second robotic cell is lagging the first robotic cell.

4. The system of claim 1, wherein determining to reconfiguring a first robotic cell performing a first manufacturing processing step to perform a second manufacturing processing step further comprises determining that the first robotic cell has been in an idle state for more than a threshold period of time.

5. The system of claim 1, wherein determining to reconfiguring a first robotic cell performing a first manufacturing processing step to perform a second manufacturing processing step further comprises determining that raw materials for the first robotic cell are exhausted.

6. The system of claim 1, wherein the manufacturing process comprises a sequence of manufacturing processing steps, and the first manufacturing processing step precedes the second manufacturing processing step.

7. The system of claim 1, further comprising one or more sensors that provide sensor data to the manufacturing execution system, wherein the manufacturing execution system determines progress of the manufacturing process from the sensor data.

8. A method for performing a plurality of manufacturing processing steps, the method comprising:

selecting, by each of a plurality of robotic cells that each includes a set of end effectors, a selected set of end effectors from the set of end effectors to perform an assigned manufacturing process step, wherein:

the assigned manufacturing processing step is one of the manufacturing processing steps in the manufacturing process; and the set of end effectors for each robotic cell includes end effectors to form a selected set for at least one of the manufacturing processing steps;

receiving, by a manufacturing execution system in data communication with each of the robotic cells, data describing a status of the manufacturing process, the data describing, for each robotic cell configured to perform a manufacturing processing step, a status of the robotic cell;

based on the status of each of the robotic cells described by received data:

reconfiguring a first robotic cell performing a first manufacturing processing step to perform a second manufacturing processing step, wherein the second manufacturing processing step is different from the first manufacturing processing step and instruct the first robotic cell to reconfigure from a selected first set of end effectors for performing the first manufacturing processing step to a selected second set of end effectors for performing the second manufacturing processing step; and in response to reconfiguring from the selected first set of end effectors for performing the first manufacturing processing step to the selected second set of end effectors for performing the second manufacturing processing step, instruct a conveyance system to reconfigure from delivering materials to be processed by the first manufacturing processing step to the first robotic cell to delivering materials to be processed by the second manufacturing processing step to the first robotic cell.

9. The method of claim 8, wherein reconfiguring a first robotic cell performing a first manufacturing processing step to perform a second manufacturing processing step further comprises:

determining that the set of end effectors for the first robotic cell includes end effectors to form a selected set for the second manufacturing processing step.

10. The method of claim 8, wherein reconfiguring a first robotic cell performing a first manufacturing processing step to perform a second manufacturing processing step further comprises determining that the second robotic cell is lagging the first robotic cell.

11. The method of claim 8, wherein reconfiguring a first robotic cell performing a first manufacturing processing step to perform a second manufacturing processing step further comprises determining that the first robotic cell has been in an idle state for more than a threshold period of time.

12. The method of claim 8, wherein reconfiguring a first robotic cell performing a first manufacturing processing step to perform a second manufacturing processing step further comprises determining that raw materials for the first robotic cell are exhausted.

13. The method of claim 8, wherein the manufacturing process comprises a sequence of manufacturing processing steps, and the first manufacturing processing step precedes the second manufacturing processing step.

14. The method of claim 8, further comprising receiving, from one or more sensors that provide sensor data to the manufacturing execution system, sensor data describing the status of the manufacturing process.

* * * * *